United States Patent Office 3,531,519
Patented Sept. 29, 1970

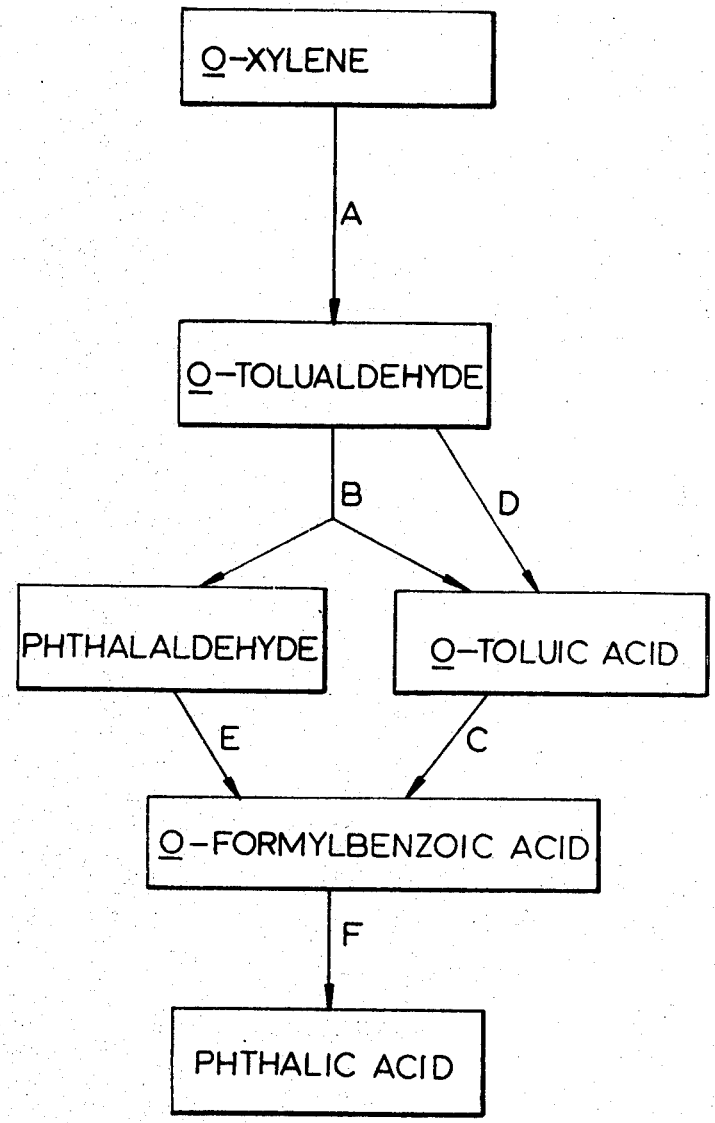

3,531,519
OXIDATION PROCESS
Christopher Parkin, Dunstable, Anthony M. Hildon, Leighton-Buzzard, and Peter J. Proctor, Dunstable, England, assignors to Laporte Chemicals Limited
Filed Aug. 16, 1967, Ser. No. 660,958
Claims priority, application Great Britain, Aug. 23, 1966, 37,777/66
Int. Cl. C07c 31/14, 47/52, 63/02
U.S. Cl. 260—524
8 Claims

ABSTRACT OF THE DISCLOSURE

The α-positions of alkyl-substituted aromatic compounds can be oxidised using hydrogen peroxide using a ferric, titanic, chromic or cupric ion as catalyst.

---

Many reagents have been proposed for the oxidation of aromatic hydrocarbons. Oxidations which give products other than aromatic carboxylic acids or their derivatives are usually difficult to control to obtain the desired product in a good yield and in a form which purification is possible. With most reagents, several products are formed, which cannot be separated on an economic scale.

It is an object of the present invention to provide a process for the oxidation of the α position in alkyl substituted aromatic compounds in good yield.

It is a further object of the present invention to provide a process for the oxidation of α positions in alkyl-substituted aromatic compounds with relatively little hydroxylation of the aromatic ring concurrently occuring.

It is a further object of the present invention to provide a process for the oxidation of methyl-benzenes which results in the production of the corresponding aldehydes with, if desired, only a small amount of the corresponding carboxylic acid being concurrently formed.

Other or further objects of the present invention will be understood by those skilled in the art from the following description.

This invention relates to the oxidation of alkyl-substituted aromatic compounds.

Many reagents have been proposed for the oxidation of aromatic hydrocarbons. It is usually difficult to control oxidations which give products other than aromatic carboxylic acids of their derivatives if the desired product is to be obtained in a good yield and in a form of which purification is possible. With most reagents several products are formed, which cannot be separated on an economic scale.

Fenton's reagent, which is an aqueous solution of ferrous ions and hydrogen peroxide, can be used as a source of hydroxyl radicals in order to hydroxylate benzene. The use of Fenton's reagent to oxidise alkylbenzenes, however, results in the production of the corresponding phenols, with little or no oxidation of the alkyl group.

The present invention provides a process for the oxidation of alkyl-substituted aromatic compounds in which the α carbon atom has two or three hydrogen atoms bonded to it wherein the alkyl-substituted aromatic compound is reacted with hydrogen peroxide at a pH below 6.0 in an aqueous medium in the presence of a catalyst containing cations of trivalent iron, tetravalent titanium, trivalent chromium and/or divalent copper. Preferably a catalyst containing trivalent iron is used. The invention includes the use of suitable mixtures of these ions.

A considerable variety of compounds can be oxidised in this way. For example, derivatives of benzene, naphthalene, and other aromatic compounds can be oxidised. The alkyl group can be any alkyl group that has at least two hydrogen atoms bonded to the α carbon atom, such as the methyl, ethyl, n-propyl, n-butyl, isobutyl, n-pentyl, isopentyl, n-hexyl, n-octyl, n-decyl, n-dodecyl and other groups. The compound may contain one or more such alkyl groups and one or more of the groups can be oxidised. The compound may contain, in addition to the alkyl group or groups, other substituents on the aromatic ring, such as chloro, nitro, hydroxy, alkoxy, or carboxylic or sulphonic acid or ester groups. It may contain aldehydic or ketonic groups, particularly those derived from oxidation processes according to the present invention, although aldehydic groups may be oxidised further in the process.

For the avoidance of doubt by the expression "α position," as used herein, we mean that carbon atom of the alkyl group which is adjacent to the aromatic ring.

The following compounds are particular examples of compounds that can be oxidised: Toluene, ethylbenzene, n-butylbenzene, n-hexylbenzene, n-decylbenzene, n-dodecylbenzene, p-xylene, m-xylene, o-xylene, the methylnaphthalenes, the ethylnaphthalenes, the three toluene-aldehydes, the three toluic acids and their esters, the three toluene sulphonic acids and their esters, and the chlorotoluenes.

A particularly important extension of the invention concerns the xylenes, and this is illustrated with reference to o-xylene although it is perfectly valid for the other xylenes. Scheme 1 illustrates the various reactions possible, and the routes by which the various products can be obtained. Reactions A, B and C are desirably performed by the process of the present invention whereas reactions D, E. and F can be performed by any other suitable oxidation method, which could include the use of hydrogen peroxide, although a process analogous to the present invention may, if desired, be employed.

While, in general, the main product of the reaction according to the invention is the α-oxo-derivative, side reactions still occur, particularly hydroxylation of the aromatic ring. Preferably the reaction is carried out at an elevated temperature, which minimises any side reactions. A further advantage of the use of elevated temperatures is the increased solubility of the aromatic compound in the aqueous phase. Conveniently the temperature range within which the reaction is conducted is from 0° C. to 200° C., desirably from 50° C. to 110° C., preferably from 80° C to 90° C.

The pressure at which the reaction takes place is preferably at least sufficient to maintain reagents and products in the liquid phase at the temperature of the reaction. Subject to this condition the reaction pressure may, if desired, be above or below atmospheric pressure.

Any acid may in principle be used to acidify the solution. Particularly suitable are those mineral acids which do not readily coordinate with metal cations, for example, sulphuric acid and nitric acid.

Excess of the aromatic reagent is conveniently used, desirably sufficient excess is used to saturate the aqueous phase throughout the whole reaction, and suitably at least sufficient to form a permanent non-aqueous phase. Preferably the reaction is carried out with a considerable excess of the aromatic reagent, and it is particularly convenient to operate the reaction when the ratio of the two phases, by volume, in the vessel in which the reaction is being carried out, is from 5:1 to 1:5. As the result of this, the organic product of the reaction is often preferentially extracted, and this has the advantage of diminishing the extent of which hydrogen peroxide reacts with the reaction product.

The aromatic compound may, however, be added to the aqeous reaction phase in solution in a suitable solvent. Preferably the solvent should be inert. Desirably it should not be miscible with water. The distribution ratios of the aromatic compound and the product between aqueous phase and the solvent, if the latter is immiscible with the former, are preferably such that the concentration of the aromatic compound in the aqueous phase is at least sufficient to allow the reaction to take place and most of the product is extracted from the aqueous phase into the solvent phase.

A batchwise method can be used for performing the reaction, using vigorous agitation to obtain rapid transference of reagents and products between the two phases. It is also possible to conduct the reaction as a continuous process, using either cocurrent or counter-current operation.

When the catalyst contains the cation of ferric iron the rate of reaction increases with increasing pH and diminishing pFe. pFe is defined by the equation $$pFe = log_{10}(Fe^{3+})$$

where ($Fe^{3+}$) is the concentration of ferric ions in the aqueous solution, expressed in terms of gram ions per litre of solution.

The reaction can, in principle, be carried out at any pH, but a practical pH range is from −1 to 6. Desirably the pH is from 4 to −1, and preferably from 1.5 to −0.5. The value of (pFe−pH) is suitably from 3 to 0 and preferably from 2.5 to 1.5, since this gives optimum yields.

The concentration of hydrogen peroxide has a marked effect on the yield of the reaction. At high concentrations, hydrogen peroxide is catalytically decomposed into water and oxygen. The hydrogen peroxide can also react with the reaction products, particularly if the organic reaction product has an unoxidised α-hydrogen atom. In a particular case such an oxidation may be desirable, for example, in scheme 1 as described above, but if it is desired to produce benzaldehyde from toluene, for example, oxidation to benzoic acid and, in addition, decarboxylation of the benzoic acid, must be avoided. In such circumstances it is desirable to minimise the concentration of hydrogen peroxide. In a batch process the hydrogen peroxide is preferably added slowly, over a period of time.

In a continuous process, the hydrogen peroxide can be added to the reaction mixture at several points in a reactor in which the reaction is being carried out. The use of a cocurrent flow process will ensure that the hydrogen peroxide concentration is low where the product concentration is highest.

Desirably the peroxide concentration is maintained below 0.1 mole/per litre, suitably below 0.06 mole per/litre, and preferably between 0.005 and 0.003 mole per litre.

The non-aqueous phase is preferably separated after the reaction with the aqueous phase and the product is then separated from it by any suitable means, which can include either physical or chemical means of separation. For example, benzaldehyde can be separated from toluene by distillation. Benzaldehyde can also be separated from toluene by a chemical method of separation which can also be used for other aldehydes. Thus, for example, the sodium bisulphite derivative of the aldehyde can be formed and can be subsequently decomposed. A suitable method of carrying out this process is by treating the aromatic phase with saturated aqueous sodium bisulphite solution. The addition compound which precipitates can then be heated preferably at reduced pressure. The aldehyde can be selectively condensed from the vapour produced which also contains sulphur dioxide and water vapour.

The following examples illustrate the invention. In the examples, the yields given are based on the consumption of hydrogen peroxide on the assumption that 2 molecules of hydrogen peroxide are required to oxidise 1 molecule of the aromatic compound.

EXAMPLE 1

200 mls. of an aqueous phase containing ferric ions, added as ferric sulphate, and sulphuric acid, in concentrations shown in Table 1 hereunder and also containing 0.1 gram. moles/litre of hydrogen peroxide, were vigorously stirred with 200 mls. of toluene at 85° C. and atmospheric pressure.

Table 1 shows the time for 90% usage of the hydrogen peroxide and the yield of benzaldehyde after 3 hours.

TABLE 1

| pH | pFe | | | | | |
|----|-----|---|---|---|---|---|
|    | 0   | 1 | 2 | 3 | 4 | 5 |
| −1 | 14% | 20% | | | | |
|    |     |     | V.s. | V.s. | V.s. | V.s. |
| 0  | ~20% | 33% | 55% | 29% | | |
|    | V.f. | 15 min | 100 min | 200 min | V.s. | V.s. |
| 1  | 5–10% | ~20% | 43% | 51% | 38% | |
|    | V.f. | V.f. | 12 min | 96 min | 200 min | V.s. |
|    |     | ~5–10% | ~20% | 34% | 43% | |
|    | V.f. | V.f. | V.f. | 15 min | 100 min | |
| 3  |     |     | 5–10% |     | 40% | 43% |
|    | V.f. | V.f. | V.f. | V.f. | | |

V.s. means very slow, i.e. more than 200 minutes.
V.f. means very fast, i.e. less than 10 minutes.

EXAMPLE 2

1,000 mls. of an aqueous phase containing $5 \times 10^{-2}$ gram. moles of ferric sulphate (pFe=1) and 1 gram. mole of nitric acid (pH=0) were vigorously stirred with 1,000 mls. of toluene at 85° C. and atmospheric pressure. 0.684 moles $H_2O_2$, added as a 25% w./w. solution, were added during a period of 8 hours. The two phases were then separated and the toluene phase contained 2.3% w./v. of benzaldehyde (63% yield).

The toluene phase was stirred with 400 mls. of saturated aqueous sodium bisulphide solution. A precipitate started to form immediately. After 3 hours the solid was filtered off, washed with toluene and air dried. The solid (48 g.) was heated at about 150° C. at 10–15 mm. pressure. 22.2 gm. of benzaldehyde were condensed from the vapour.

EXAMPLE 3

100 mls. of solution containing sulphur acid, a metal sulphate and hydrogen peroxide in concentrations given in Table 2 hereunder were stirred with 100 mls. of toluene, at the temperature shown, until no more peroxide could be detected. The yield of the various products are given below in Table 2.

TABLE 2

|  | Metal | | | | |
|---|---|---|---|---|---|
|  | $Fe^{2+}$ | $Fe^{3+}$ | $Fe^{3+}$ | $Fe^{3+}$ | $Cu^{2+}$ |
| Metal ion conc. | 50 | 50 | 1,000 | 50 | 50 |
| $H_2O_2$ conc. | 10 | 10 | 10 | 10 | 10 |
| pH | 2 | 2 | 0 | 0 | 0 |
| Temp., ° C. | 18 | 0 | 25 | 90 | 90 |
| Percent yields: | | | | | |
| Benzaldehyde | 1 | 17 | 30 | 50 | 48 |
| Cresols | 5 | 7 | Trace | | |
| Bibenzyl | 1 | | | Trace | Trace |

All concentrations in this table are in millimoles/litre.

EXAMPLE 4

100 mls., of solutions containing hydrogen peroxide, and ferric sulphate, in concentrations as shown in Table 3 hereunder, together with sufficient sulphuric acid to make the pH of the solution O, were stirred with 50 mls. of the reagents shown below, at 95° C., until no more peroxide could be detected. Yields and products are shown in Table 3 below.

TABLE 3

| Reagent | Ferric ion conc. | $H_2O_2$ conc. | Product and yields |
|---|---|---|---|
| Ethylbenzene | 10 | 10 | 20% acetophenone. |
| p-Xylene | 50 | 10 | 40% p-Tolualdehyde. |
| p-Tolualdehyde | 50 | 5 | 26% p-Toluic acid and 39% terephthaldehyde. |

All concentrations in this table are in millimoles/litre.

EXAMPLE 5

100 mls., of aqueous phase, containing ferric sulphate (pFe=2), hydrogen peroxide (concentration 0.135 molar), and containing 1 gram. equivalent per litre of the acid stated in Table 4 below, were vigorously stirred with 100 mls. of toluene at 85° C. for 3 hours. Table 4 gives the yield of benzaldehyde.

Table 4

| Acid | Yield, percent |
|---|---|
| Acetic acid | 26.4 |
| Hydrochloric acid | 58.5 |
| Nitric acid | 74.5 |
| Sulphuric acid | 55.0 |

Example 6

To 100 mls. of a 0.01 molar solution of each of the undermentioned metal ions, added as the sulphates, in N sulphuric acid sufficient 65% hydrogen peroxide was added to make the solution 0.1 molar in hydrogen peroxide. This solution was stirred with 100 mls. of toluene for 3 hours at 85° C. The toluene layer was then analysed for benzaldehyde. Table 5 below shows the metal ions used and the yields of benzaldehyde.

Table 5

| Metal ion | Yield, percent |
|---|---|
| $Cr^{3+}$ | 36 |
| $Ti^{4+}$ | 13 |
| $Fe^{3+}$ | 56 |

EXAMPLE 7

This example illustrates the use of the invention with a variety of aromatic compounds. 200 mls. of an aqueous solution containing $2 \times 10^{-2}$ gram. moles of ferric ions per litre was adjusted to PHO using nitric acid. The solution was then stirred vigorously with the volume of aromatic compound stated in Table 6 below, and the temperature of the mixture raised to reflux temperature. The hydrogen peroxide was then added; in 12 aliquots every 6 minutes. 180 minutes after the initial addition of the hydrogen peroxide the mixture was cooled. In runs 1, 2 and 3, the aromatic compound layer was separated directly. In runs 4, 5 and 6, ether was added and the ethereal layer separated. In all cases these layers were analysed by vapour phase chromatography. The yields observed are given in Table 6 below.

Runs 1, 2 and 3 were with para-, meta-, and ortho-xylene, respectively. The main product was the tolualdehyde in each case, but less than 2% of the dialdehyde and of the toluic acid were also detected.

Runs 4, 5 and 6 were with para-, meta-, and ortho-tolualdehyde respectively. The main product was the dialdehyde in each case and a substantial amount of dicarboxylic acid was also formed, the yield of which is also shown in the table below. Less than 2% of the toluic acid was also detected.

TABLE 6

| | Run | | | | | |
|---|---|---|---|---|---|---|
| | 1 | 2 | 3 | 4 | 5 | 6 |
| Volume of aromatic compound (mls.) | 200 | 200 | 200 | 10 | 10 | 10 |
| Total $H_2O_2$ added (m.moles) | 56 | 56 | 56 | 55 | 55 | 55 |
| Yield of main product, percent | 70 | 51 | 63 | 68 | 50 | 63 |
| Yield of diacid, percent | | | | 21 | 18 | 22 |

We claim:
1. In a process for the oxidation of aromatic compounds using hydrogen peroxide as oxidising agent in aqueous medium at a pH of less than 6, the improvement which comprises selectively oxidising the α position of alkyl groups in alkyl substituted aromatic compounds having at least two hydrogen atoms bonded to the α carbon atoms by using as catalyst trivalent iron ions or tetravalent titanium ions or trivalent chromium ions or divalent copper ions.

2. A process according to claim 1 wherein the aromatic compound has a single aromatic ring.

3. A process according to claim 2 wherein the aromatic compound is a methyl-substituted derivative of benzene.

4. A process according to claim 3 wherein the methyl-substituted derivative of benzene is a toluene.

5. A process according to claim 3 wherein the aromatic compound is a xylene.

6. A process according to claim 3 wherein the catalyst is the trivalent iron ion and the value of the function, $$[pFe = -\log_{10}(Fe^{3+})]$$

$$pFe - pH$$

in the aqueous medium is from 3 to 0, in which the function pFe has the meaning given by the equation $$pFe = -\log_{10}(Fe^{3+})$$

7. A process according to claim 6 wherein the value of the function, $$pFe - Ph$$

in the aqueous solution is from 2.5 to 1.5.

8. A process according to claim 6 wherein the pH of the aqueous medium is from 4 to −1.

References Cited

UNITED STATES PATENTS 1,302,273   4/1919   Applebaum _____ 260—599

OTHER REFERENCES

Groggins, Unit Processes in Organic Synthesis, 4th ed., 1952, p. 422.

LORRAINE A. WEINBERGER, Primary Examiner

R. S. WEISSBERG, Assistant Examiner

U.S. Cl. X.R.

260—592, 599, 621